US005754173A

United States Patent [19]
Hiura et al.

[11] Patent Number: 5,754,173
[45] Date of Patent: May 19, 1998

[54] METHOD AND SYSTEM FOR CREATING USER INTERFACE INDEPENDENT PROGRAMS WITH A USER INTERFACE PROVIDER

[75] Inventors: Hideki Hiura, Mountain View; Hiroko Sato, San Jose, both of Calif.

[73] Assignee: Sun Microsystems, Inc., Palo Alto, Calif.

[21] Appl. No.: 607,939

[22] Filed: Feb. 28, 1996

[51] Int. Cl.[6] ........................................ G06F 3/114
[52] U.S. Cl. .................... 345/333; 345/334; 345/339
[58] Field of Search ........................... 395/333, 334, 395/335, 339, 340, 326, 348, 349

[56] References Cited

U.S. PATENT DOCUMENTS

| 5,040,131 | 8/1991 | Torres | 364/521 |
| 5,159,329 | 10/1992 | Ohtani et al. | 340/712 |
| 5,317,732 | 5/1994 | Gerlach, Jr. et al. | 395/600 |
| 5,345,250 | 9/1994 | Inoue et al. | 345/100 |
| 5,408,333 | 4/1995 | Kojima et al. | 358/400 |
| 5,592,605 | 1/1997 | Asuma et al. | 395/348 |
| 5,596,695 | 1/1997 | Hamada et al. | 395/333 |
| 5,603,034 | 2/1997 | Swanson | 395/701 |

FOREIGN PATENT DOCUMENTS 0 569 902 A2 11/1993 European Pat. Off.
0 622 729 A2 11/1994 European Pat. Off.
0 622 729 A3 11/1994 European Pat. Off.

OTHER PUBLICATIONS

Shripad Patki, et al., "SunSoft's L10N Kit for Solaris," *Multilingual Computing*, vol. 5, Issue. 2, pp. 42–43.

Jean-Marie Chauvet al., Open Interface: Un outil de construction d'interfaces graphiques portables, 2200 Gene Logiciel and et Systems Experts, No. 24, Sep. 1991,pp. 90–102, Nanterre, France.

IBM Technical Disclosure Bulletin, vol. 34, No. 5, Oct. 1, 1991, pp. 321–322, XP000189757, "Model View Schema."

*Primary Examiner*—Raymond J. Bayerl
*Assistant Examiner*—Steven P. Sax
*Attorney, Agent, or Firm*—Graham & James LLP

[57] ABSTRACT

An apparatus and method for separating the design and implementation of a user interface ("the user interface logic") from the design and implementation of the functional portion of a software program (the "core logic"). The present invention uses an object-oriented programming model in which one or more look and feel agents act as servers for one or more logic objects. The look and feel agent controls the appearance and behavior of the user interface, while a logic objects perform the functions of the software program. A look and feel agent does not "know" what functions constitute the core logic and the logic objects do not "know" what the user interface looks like or how it behaves.

17 Claims, 24 Drawing Sheets

Agents/Brokers Interface

Look&Feel Agent

The *interface* LnFAgent is defined as follows in IDL.

```
interface LnFAgent {
    LnFAgent ( in const char*,         // configuration filename
            in const char* = "",    // version number
            in const char* = "C",   // locale
        );
    ~LnFAgent();
    void bind_cb( in const char*,         // callback ID specified in C
            in CallbackType,        // callback routine
            in void*                // callback data
        );
    void set_cw_resource( in const char*,         // widget instance name
            in cw_resource,         // resource name
            in const char*          // value
        );
    void set_cw_resource( in const char*,         // widget instance name
            in CW_Resource,         // resource name
            in int                  // value
        );
    void set_cw_input(
```

FIG. 5(a)

```
                in const char*,     // widget instance name
                in int              // value
            );
        void set_cw_input( in const char*,     // widget instance name
                in const char*      // value
            );
        void set_cw_input( in const char*,     // widget instance name
                in CW_Data          // value
            );
        void set_cw_input( in const char*,     // widget instance name
                in CW_DataList      // value
            );
        void display_gui(
                (void)(*)(void) = NULL  // logic routine
            );
};
```

*constructor and destructor*

> LnFAgent() and LnFAgent() are constructor and destructor respectively. LnFAgent() reads the configuration file whose name is the concatenation of the two arguments, "filename" and "version", and creates proper composite widgets.

set_cw_resource() and set_cw_input()

> setResource() sets a resource of a widget instance. Depending on the widget type and resource type, set_cw_resource() may take more than two arguments.

> set_cw_input() initializes a widget with necessary information.

bind_cb()

> From the configuration file Look&Feel agent only learns the IDs of callbacks which should be invoked as an event occurs. We still need a mechanism to locate the callback address by its ID. bind_cb() serves such purpose. If the first argument

FIG. 5(b)

matches the callback ID in the configuration file, the handler specified in the second argument is called.

The type of the handler, "CallbackType", is defined as int (*)(LnFAgentMessageType, void* clnt_data)

The second argument, "clnt_data", is the third argument passed in bind_cb().

The type of the first argument "LnFAgentMessage" is a pointer to a struct with two members -

```
typedef struct {
    const char*  widgetID;
    void** result;
} *LnFAgentMessage;
```

The first member identifies where the event comes from. The second member contains the outputs as specified in the configuration file.

The event handler returns 0 if no error happens.

*display_gui()*

The Look&Feel agent may start to display GUI. The logics wait until the window is destroyed.

FIG. 5(c)

logic.cc

```cpp
#include <stdlib.h>
#include <unistd.h>
#include <iostream.h>
    #include <string.h>
#include "qlist.hh"
#include "LnFAgent.hh"

const. char* MYCONFIG = "xxx.conf";
LnFAgent* myagent;

void
myErrorHandler(void*, const char* msg) {
    cerr << "In myErrorHandler : message is: " <<msg << endl; } void
myExitHandler(void* msg) {
    cerr << "In myExitHandler : message " << (char*) msg << endl; } int
myCallback (void*) { cerr << "Callback ..." << endl;
        static int i = 0;
        i = 1 - i; return i; } int
quitCB(void*) { cerr << "In QuitCB, Exit 0" << endl; exit(0);
        /* not reached */ return 0; } int
actCB2(void*) {
    cerr << "In actCB2 and sleep" << endl;
    myagent->set_cw_resource("ROOT", "CWmessage", "hi there");
        return 0;
} main() {
        myagent = new LnFAgent (myErrorHandler);

myagent->config_ui (MYCONFIG);

myagent->bind_callback("deliverCB", myCallback, NULL);
    myagent ->bind_callback ("quitCB", NULL);
    myagent->bind_callback ("actCB2", actCB2, NULL);
```

602

604

Example Logic Object
FIG. 6(a)

```
// construct medium list
static char* pp[ ] = { "CD-ROM", "TAPE", "EMAIL", "FILE", NULL };
static char* qq[ ] = { "/dev/rst0", "/dev/rst1", "", "", NULL };
static int rr[ ] = { 1, 1, 1, 0, NULL };
int i;
QList<RadioList> qlist;
QListIter<RadioList> qit (qlist);

for (i=0; pp[i] != NULL; i++) {
        RadioList * r = new RadioList;
        r->label = strdup(pp[i]);
        r->media_path = strdup(qq[i]);
        r->is_read_only = rr[i];
        qit.ins_next(*r);                                                       606
}
myagent->set_cw_resource("menu1", "CWInput", (CWData*) &qlist);

CWString s1[ ] = {
 {"OS"},
 {"Windows"},
 {"AnswerBook"},
 {"dinner"},
 {"lunch"},
 {"hi"},
 {0}
};
        QList<CWString> slist;
        QListIter<CWString> iter_slist(slist);;
        for(i = 0 ; sl[i].get_value() !=0 ; i++) {                              608
                iter_slist.ins_next(sl[i]);
        }
        myagent->set_cw_resource("browser1", "CWInput", (CWData*) &slist);

myagent->display_ui(myExitHandler, "It's over");
```

Example Logic Object
FIG. 6(b)

Look and Feel Agent (Local Object Manager)

Syntax rules used in a config file:

config_file::
    802
    LAYOUT layout_section RESOURCE resrc_section ACTION act_section layout_section::
    layout_statement...

layout_statement::
    WidgetID.WidgetClass: widget_id_list widget_id_list::
    WidgetID / widget_tree widget_tree::
    WidgetID(widget_id_list,...)

resrc_section::
    [ resrc_statement... ]

resrc_statement::
    WidgetID.ResourceID: Value action_section::
    [ act n_statment... ]

action_statement::
    WidgetID[.ActionType]: action action::
    single_action | multi_action single_action::
    CallbackID | <resrc_statement> | if_action if_action:: IF (CallbackID) THEN action [ ELSE action ]

multi_action:: { action... }

FIG. 8(a)

WidgetID:: string
WidgetClass:: string
ResourceID:: string
Value:: string
ActionType:: string
CallbackID:: string 1.    [x] means x can be omitted
2.    x... means x can be repeated
3.    x/y means x or y
4.    "LAYOUT", "RESOURCE" and "ACTION" are pre-defined keywords.
5.    "ROOT" is a predefined WidgetID

FIG. 8(b)

xxx.conf

```

#      Delivery Subsystem Configuration File

#      Words in upper case are pre-defined keywords.

#      syntax:

#      LAYOUT:
#              parentWidgetID.widgetClass: [ widget_id |
#                      widget_id(subwidgetID,..) ]
#      RESOURCE:
#              widget_id.resource:      value
#      ACTION:
#              widget_id: [ callbackID(widget_id...) |
#                      <widget_id.resource:     value> ]

```

*902*

```
LAYOUT
        ROOT.actionW:    action1(\
                                action2(act2_1, act2_2), \
                                action3, \
                                action4(\
                                        act4_1, act4_2, act4_3(\
                                                act4_3_1) \
                                ) \
                        )
#       ROOT.actionW:            help1
        ROOT.shortExclusiveListW: menu1
        ROOT.browserW:           browser1
```

*904*

```
RESOURCE
        action1.CWlabel:        Deliver
        action2.CWlabel:        Change Msg Area
        action3.CWlabel:        QUIT
        act2_1.CWlabel:   ACT2_1
#       help1.CWlabel:    HELP ME
#       ROOT.CWmessage:  mmmmmm
#       menu1.CWlabel:    Media
#       browser1.CWlabel:       Deliverables

#INPUT:
#       menu1:           dataList
#       browser1:        dataTree

```

Example Configuation Info
FIG. 9(a)

```
#OUTPUT:
#       menu1:          data
#       browser1:       dataList

# p.s. Showing INPUT and OUTPUT sections here is for your information
       only.  Users can not change the pre-defined input and output types of
       the composite widgets
       L&F Agent will not recognize INPUT and OUTPUT commands.

ACTION
    act2_1: IF (deliverCB) THEN \
                    <ROOT.CWmessage: hello> act2_2: IF (deliverCB) THEN \
                    <ROOT.CWmessage: hello> \
                ELSE { <ROOT.CWmessage: world> actCB2 }
    action3:        quitCB
#   act2_1: quitCB
```

906

Example Configuration Information
FIG. 9(b)

Composite Object ClassHierarchy

Composite Widget #2 (Lets User select one of a group of choices)
(Text version)

```
//
// CWMainframe.h:  This is the Mainframe window for all subsystems.
//                 It contains, menubar, body and footer message area.
//                 Resources that you can change is only for Form Widget.
//                 (Resources for Form widgets should be specified from the
//                 children of Form Widget)

#ifndef_CWOBJ_CWMAINFRAME_HH
#define_CWOBJ_CWMAINFRAME_HH
#incude "CWObj.hh"
#include "I18NString.hh"

struct CWMainframeP ;  // forward declaration
struct PopupData;

#include "qlist.hh"

struct menuTree{
        I18NString label;              //label string
        I18NString mnemonic;           //label mnemonic
        I18NString accelerator;        //accelerator
        I18NString acceleratorText;    //acceleratorText
        void (*cb) (void*);            //cb to be registered
        //----define your own type
        void * cb_data;                //call_data added 9/14/94
static const int op_id; //
        static MenuTree* decode(char* s, char*& to) { return NULL; } ;
        void encode(char*& buf, int& len) const {};
};

enum Popup_Status_mode {Ok,  //ok btn pressed
                        Cancel //cancel button pressed
                       };

class CWMainframe : public CWObj {
  public:
        CWMainframe(const char *) ;     //User:instance name
        -CWMainframe() ;
        void instantiate_help_panel () ;
        void open_help () ;
        void close_help () ;
        void write_help_text(const I18NString&) ;
        void create_pulldown(QList<MenuTree>&) ;//User:cb registration will be down
                                        // inside here..
                                        // User use this to add pulldown
                                        // menu like "File"
// The methods which override CWObj methods.
        XMApplicationShell *get_toplevel() ;
                                Composite Widget
                                FIG. 15(a)
```

```
XMObject            *get_parentContainer();
void                set_right_footer_message(I18NString &) ;
void                set_left_footer_message(I18NString &) ;
void                set_frameTitle(I18NString &) ;
```

//popup panels for warning/text entries.////////////////////////
    void set_okpopdown(PopupData *);
    //use this for popping up any warning messages.
    //Only has OK button
```
        void            popup_warning(I18NString &) ;
```

//use popup_prompt when you want user to type
    //in the entry such as file name
    //Has both OK and Cancel button
```
void            popup_prompt(I18NString &);
void            set_popupfield_content(char *) ;//CW only
void            popdown_prompt() ; //call this to popdown the popup
void            reg_prompt_ok_cb(void(*cb)(void*), void *client_data) ;
void            reg_prompt_cancel_cb(void(*cb)(void*), void
                    *client_data);
I18NString *    get_prompt_content() ; //output
```

//use this to display error message
//Only displays OK button
```
void            popup_error(I18NString &) ;
```

//Working(busy) Popup///////////////////////
// NO button
// Popdown when process is complete
//////////////////////////////////
```
void            popup_working() ;
void            popdown_working();
```

//Question Popup////////////////////////////
//use this to ask user a question
//Has both OK and Cancel button
```
void            popup_question(I18NString &) ;
void            reg_question_ok_cb(void(*cb)(void *), void *client_data) ;
void            reg_question_cancel_cb(void(*cb) (void *) , void
                    *client_data) ;
void            popdown_question();
```

//used only in CW
```
void            set_status(Popup_Status_mode,PopupData *) ;
```
//return if user selected OK or cancel btn
```
Boolean         get_status() ;
```

Composite Widget
FIG. 15(b)

```
//use this button if you want to give some
//friendly info to the user
//Has OK button
void                    popup_info(I18NString &) ;

//Selection Popup////////////////////////////////
//list selection choices
// contains OK and Cancel buttons
void                    popup_selection(QList<I18NString> &) ;
void                    reg_select_ok_cb(void(*cb) (void *) , void *client_data);
void                    reg-select_cancel_cb(void(*cb) (void *), void
                            *client_data) ;
void                    popdown_selection() ;
void                    set_selectedValue (XmSelectionBoxCallbackStruct *) ;
                            //CW use only
I18NString *            get_selectedItem() ;

//DoubleTextf Popup////////////////////////////////
// Two input area : use it for file and directory type of inputs
// It comes with cancel and ok btn
// You can set up message area using set_msgBody(I18NString &)
void                    pop_doubleTextf(QList<I18NString> &) ;
void                    popdown_doubleText();
void                    reg_doubletext_cancel_cb(void(*cb) (void*) ,
                            void *client_data);
void                    reg_doubletext_ok_cb(void(*cb) (void*) ,
                            void *client_data) ;
void                    set_msgBody(I18NString &) ;
QList<I18NString> *     get_doubleFields() ;
```

Composite Widget
FIG. 15(c)

```
//CWFilePick/////////////////////////////////////////
void    reg_file_cancel_cb(void(*cb) (void*) , void *client_data) ;
void    reg_file_ok_cb(void(*cb) (void*) , void *client_data) ;
void    popup_filepick () ;
void    popdown_filepick () ;
void    set-default_path (I18NString &) ;
I18NString * get_selection() ;
private:
CWMainframeP *p;
void    set_menuItems (QListIter<MenuTree>, void*) ;
void    instantiate_prompt_panel();
void    instantiate_question_panel() ;
void    instantiate_doubleTextf() ;
void    instantiate_sel_box() ;

};

#endif           // _CWOBJ_CWMAINFRAME_HH
```

Composite Widget
FIG. 15(d)

METHOD AND SYSTEM FOR CREATING USER INTERFACE INDEPENDENT PROGRAMS WITH A USER INTERFACE PROVIDER

FIELD OF THE INVENTION

This invention relates to generating a display on a computer screen and, more particularly, to a method and apparatus for separating the design and development of user interface functions from the design and development of core logic functions in a data processing system.

BACKGROUND OF THE INVENTION

A software program that is executed by a data processing system must have a way to "talk" to the world outside the computer system. For example, many software programs include a "graphical user interface" (GUI) that allows a human being using the software to give instructions to the software by moving a pointer on a display device with a mouse, a touchpad, or the like. The Windows operating system is an example of a software program that interfaces with the user via a GUI. ("Windows" is a trademark of Microsoft, Inc.) Another example of an operating system that uses a GUI is the OpenLook operating system, which is manufactured by Sun Microsystems. "OpenLook" is a trademark or a registered trademark in the U.S. and foreign countries of Sun Microsystems. Another example of an operating system that uses a GUI is the OpenStep operating system, which is manufactured by Next, Inc. "OpenStep" is a trademark of Next, Inc.

It is desirable for software programs to use GUIs when interfacing with human users because human users find GUIs easier to use than traditional character-based computer interfaces. As a rule, however, GUIs are more complex than traditional character-based interfaces and take more time and effort to design and program. Thus, GUIs are more expensive and take more time to develop than non-graphical, character-based user interfaces.

Generally speaking, software that uses a GUI performs several functions. First, the software must be able to display elements on the display device and must be able to adjust the displayed information in response to actions by the user, such as the user moving a cursor on the display device with a mouse. This function is an example of a "user interface function." Second, the software must be able to perform the actions indicated by the user via the user interface (such as performing one of a list of optional functions chosen by the user). These functions are examples of "core logic" functions. Conventionally, software programs have contained both user interface functions and core logic functions. For example, within a single software program, a core logic function might make calls to a user interface function that opens a new window on the display device. In such conventional programs, the call to the user interface function (where the call includes the name of the user interface function) is an integral part of the core logic.

Most software is designed to operate with a single GUI. For example, the Microsoft "Windows" operating system expects to operate using a conventional Windows GUI. The GUI used with Windows will always look a certain way and there is no provision within Windows to use a different GUI. Modifying a program written to run under Windows to use a different GUI would involve extensive modifications to the core logic of the program. In other words, software programs written to run under Windows are tied to the Windows GUI and cannot be easily changed.

It is desirable to be able to use any user interface with any software program. If the software program can operate with any user interface, the design of the user interface can be changed at will without having to change the core logic of the software program itself. Such a scheme would, for example, allow one or more GUIs to be developed independently of the core logic of the software program without impacting the design or complexity of the core logic of the software program. In addition, it would be easy to use different GUIs under different circumstances, since the only time involved in switching between GUIs would be the time required to develop or install the new GUI itself. No changes to the core logic of the software program would be required.

As discussed above, conventional software programs mix user interface functions and core logic functions and intertwine the operation of the two types of functions. Another problem arising from the mixing of user interface functions and core logic functions is that certain computer programmers are expert at writing computer programs for user interface functions or for logic functions, but not for both. Adding a different user interface to a software program is a problem for a computer programmer who is expert in core logic programming but who is not expert in user interface programming. Similarly, if the user interface logic is too closely tied to the core logic, it creates problems for a programmer who is expert in user interface programming, but not in core logic programming.

Conventional software sometimes allows a software program to operate with different user interfaces. This usually is accomplished by re-linking the core logic software so that it is linked to run with a new user interface. Before the relinking process can be performed, the core logic must be modified to refer to the new user interface. In other conventional software, the software is able to access a common "Application Program Interface" (API) layer that allows the software to use one of a plurality of user interfaces. In this case, however, the software program controls which user interface it uses and controls the initial selection of that user interface within the API. Thus, the functionality of the core logic is not completely separate from the choice and functionality of the user interface.

SUMMARY OF THE INVENTION

The present invention provides an apparatus and method for separating the design and implementation of a user interface from the design and implementation of the functional portion of a software program (the "core logic"). The present invention uses an object-oriented programming model in which one or more "look and feel agents" (hereinafter "L&F agents") act as servers for one or more logic object clients. A L&F agent controls the appearance and behavior of the user interface, while a logic object performs the functions of the software program. A L&F agent does not "know" what functions constitute the core logic and the core logic does not "know" what the user interface looks like or how it behaves.

In accordance with the purpose of the invention, as embodied and broadly described herein, the invention relates to a method of controlling the appearance and behavior data displayed on of a display device in a data processing system, the method performed by the data processing system and including the steps of:

defining by a look and feel agent, an appearance of a widget using configuration information that is not a part of the look and feel agent;

performing, by a core logic object, a core logic function;

determining, by the core logic object during performance of the core logic function, that data must be displayed on the display device;

sending information from the core logic object to the look and feel agent, the information representing the data to be displayed; and displaying, by the widget of the look and feel agent, the data represented by the information sent by the core logic object.

BRIEF DESCRIPTION OF THE DRAWINGS

The objects, features, and advantages of the system of the present invention will be apparent from the following description, in which:

FIGS. 5(a) through 5(c) show exemplary functions called by the logic object of FIG. 3 to interface between the logic object and the look and feel agent.

FIG. 6 shows source code for an example logic object.

FIG. 8 shows a syntax of configuration information used by the look and feel agent.

FIG. 9 shows an example of configuration information in accordance with FIG. 8.

FIGS. 15(a)–15(c) show an example of a composite widget.

DETAILED DESCRIPTION OF THE PREFERRED EMBODIMENTS

The following description is of the best presently contemplated modes of carrying out the invention. This description is made for the purpose of illustrating the general principles of the invention and is not to be taken in a limiting sense.

I. Operating Environment

The environment in which the present invention is used encompasses a general distributed computing system 100, wherein general purpose computers, workstations, or personal computers are connected via communication links of various types, in a client-server arrangement, wherein programs and data, many in the form of objects, are made available and shared by various members of the system for execution and access by other members of the system.

Figure 1:
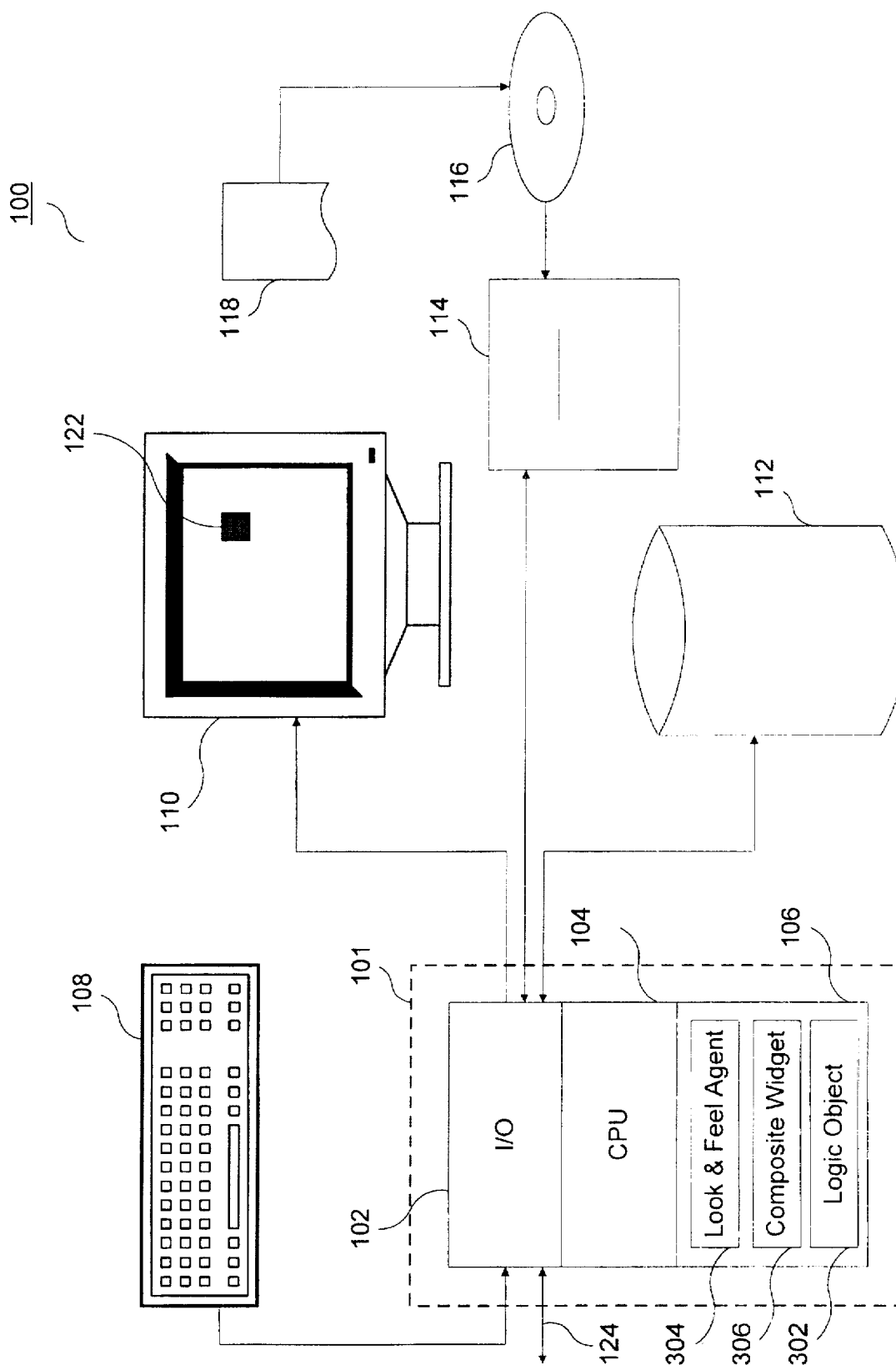
FIG. 1 illustrates an exemplary computer system in accordance with a preferred embodiment of the present invention.

Some of the elements of a general purpose workstation computer are shown in FIG. 1. FIG. 1 shows a processor 101, which has an input/output ("I/O") section 102, a central processing unit ("CPU"), 104, and a memory section 106. Memory section 106 includes a logic object 302, and a look and feel agent 304 (hereinafter "L&F" agent 114), and a composite Widget 306. Elements 302, 304, and 306 and their uses are discussed below in detail. The I/O section 102 is connected to a keyboard 108, a display unit 110, a disk storage unit 112, and a CD-ROM drive 114. CD-ROM drive 114 can read a CD-ROM medium 116, which typically contains programs 118 and data. A computer display icon 22 is shown on display unit 110. Similar workstations may be connected by a communications path 124 (e.g., an Ethernet network) to form a distributed computer system.

II. A Preferred Embodiment

The present invention is included as a part of Sun Microsystem's L10N Development Kit, version 2.0. The functionality of the L10N Development Kit, which currently uses a graphical user interface, is intended to help computer programmers "localize" software products by tailoring certain aspects of the software products and manuals to various countries in which the software products and manuals are to be distributed. An early version of the L10N development kit is described in detail in U.S. application Ser. No. 08/181,712 of Kwan et al., filed on Jan. 14, 1994, now abandoned which is herein incorporated by reference. The present invention, however, may be used with any software program that interfaces with a human being and is not limited to use with localization programs or with any particular type of computer software. Moreover, the present invention is not limited to GUIs, but can integrate any type of user interface with the logic performing portion of a computer program. For example, the present invention can be used to add a text-based user interface to a computer program.

The described embodiment of the invention is written in the $C_{++}$ programming language. $C_{++}$ is an object-oriented language and, although the present invention will be described in terms of an object-oriented implementation, the present invention could also be implemented without using an object-oriented implementation. The described embodiment utilizes the Solaris operating system. Solaris is a version of the UNIX operating system that is manufactured by Sun Microsystems, Inc. Solaris is a trademark of Sun Microsystems, Inc. "UNIX" is a registered trademark in the United States and other countries, exclusively licensed through X/OPEN, Ltd.

Figure 2:
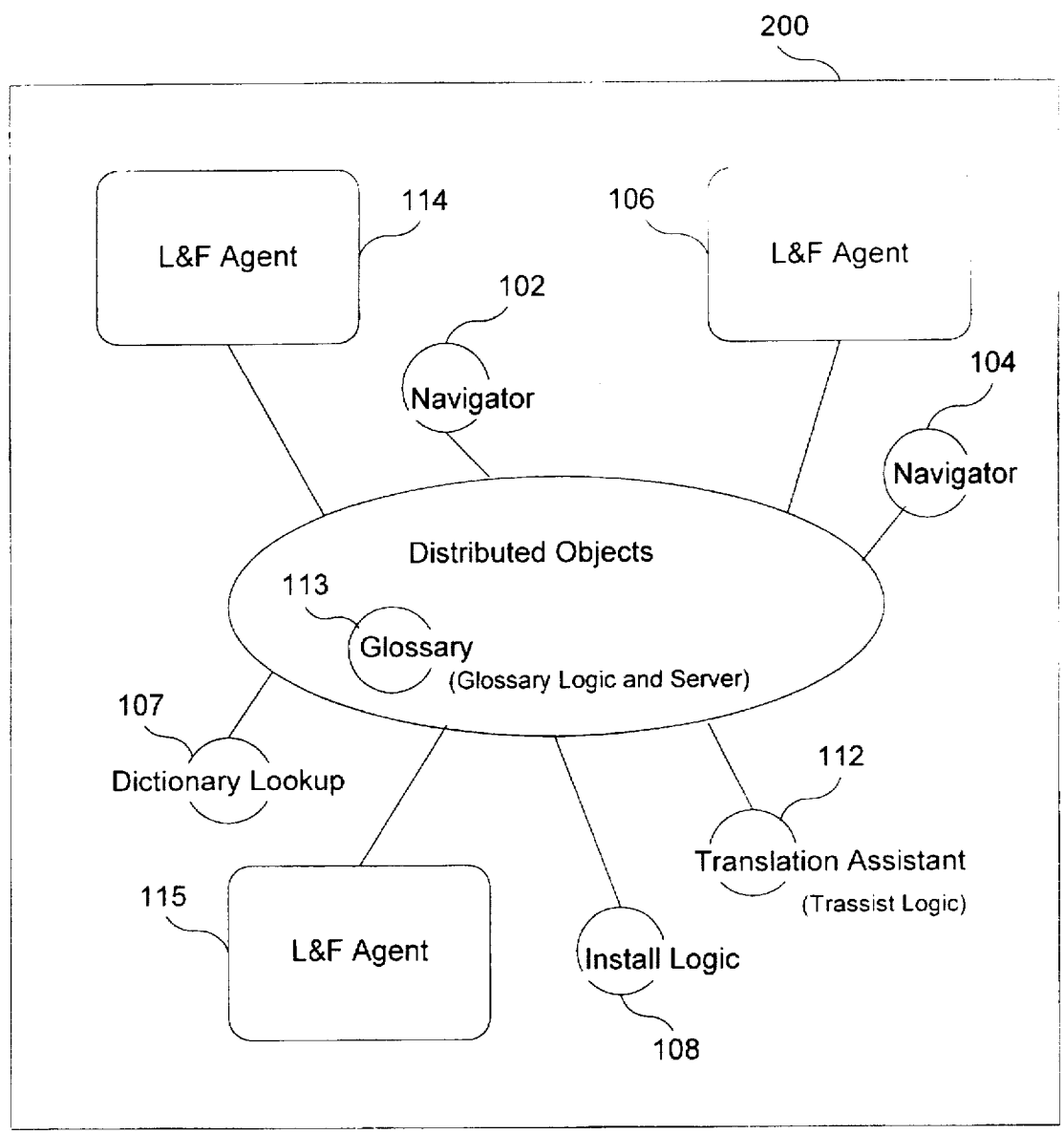
FIG. 2 is a representation of an "object world" in a preferred embodiment of the present invention.

FIG. 2 is a representation of an object world 200 in a preferred embodiment of the present invention. The objects of FIG. 2 are classified into two types: logic objects 102, 104, 107, 108, 112, and 113 and L&F agents 106, 114, 115. Object-oriented programming is well-known to persons of ordinary skill in the art and will not be discussed in detail herein. In a preferred embodiment of the present invention, objects and agents communicate by "object migration" as discussed below.

In the described embodiment, logic objects provide the functionality of the system by performing localization functions. In this embodiment, localization functions are examples of core logic functions. For example, FIG. 2 shows a logic object 102 that performs the functions of "Navigator". The logic objects of FIG. 2 also include: "Dictionary Lookup" 107, "Translation Assistant" 112, "Install" 108, and "Glossary" 113. The specific nature of the core logic functions are not a part of the present invention and will not be discussed in detail. The present invention is directed to separation of the function of the core logic of logic objects from the user interface functions of L&F agent 114. This separation allows the logic objects to operate with L&F agents that implement various user interfaces.

Figure 3:
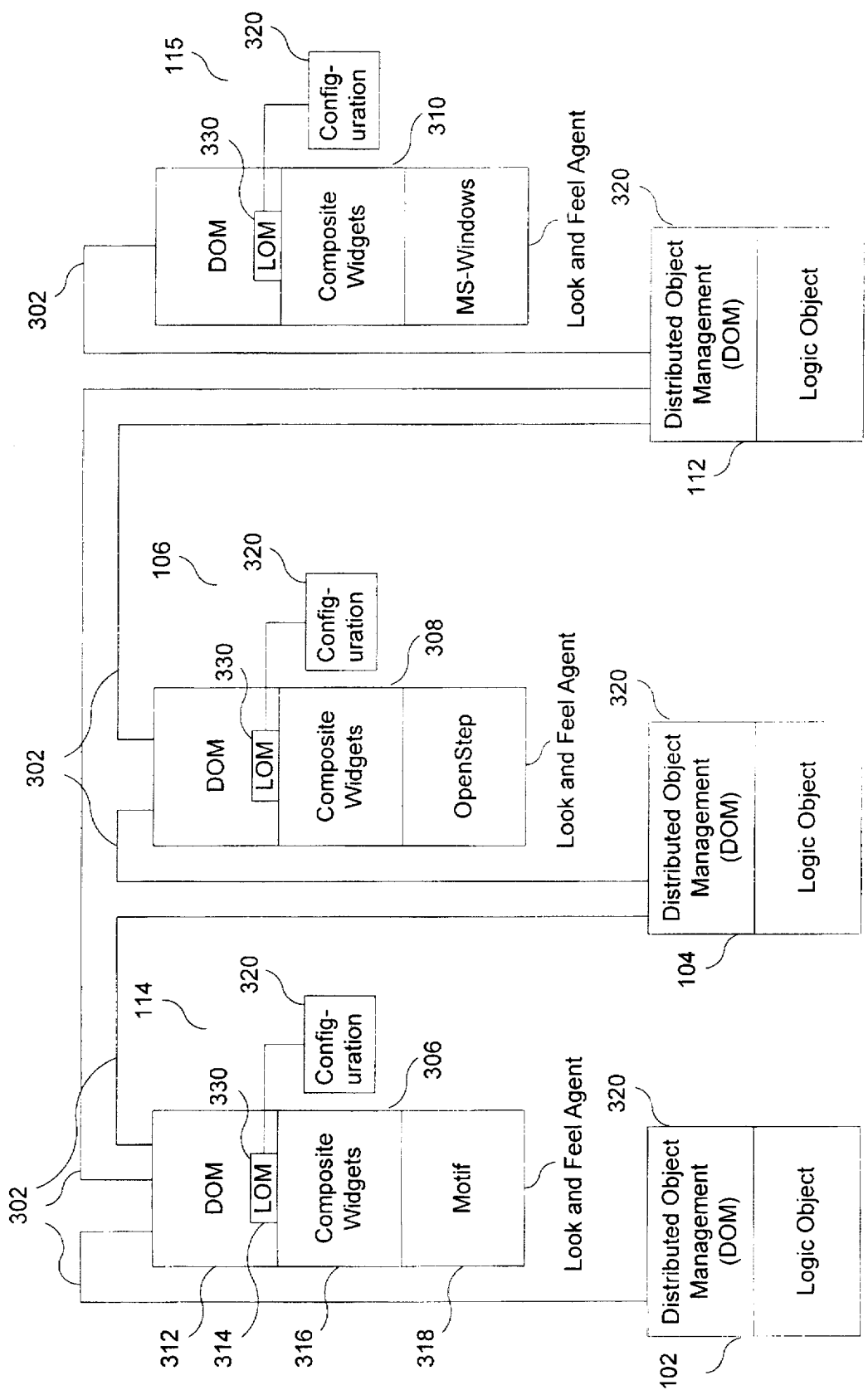
FIG. 3 is a block diagram showing a plurality of logic objects communicating with a plurality of look and feel agents of FIG. 2.

FIG. 3 is a block diagram showing a plurality of logic objects 102, 104 and 112 communicating with a plurality of L&F agents 114, 106 and 115. Each line 302 of FIG. 3 represents a connection established between a logic object and a L&F agent using "object migration," as discussed below. Lines 302 do not necessarily represent separate physical connections. Each L&F agent includes a plurality of composite widgets, each plurality represented by respective reference numbers 306, 308 and 310.

A logic object communicates with a L&F agent via a "Distributed Object Management" (DOM) system 320. This system passes objects containing predefined information between the logic objects and the L&F agents. In each L&F agent, a "Local Object Manager" (LOM) 330 in the DOM accesses configuration information 320. The LOM 330 then initiates composite widgets in accordance with the configuration information. The LOM interfaces with the composite widgets, which perform GUI functions. Composite widgets 306, 308 and 310 are designed to operate with three different GUI's. Motif, OpenStep, and MS-Windows are shown in the Figure as examples. The LOM 330 is the same in agents 106, 114 and 115.

In the present invention, multiple logic objects may act together as an individual process or as an individual thread within a process. Multiple logic objects may also act independently as separate threads or as separate processes. The system may contain any number of L&F agents, which interface to various GUI's. Respective L&F agents in the system may control different respective user interfaces at a given time. Some L&F agents may be on a different network node than all or some of the logic objects.

The following paragraphs discuss L&F agent 114 and logic object 102, although the discussion is equally applicable to any L&F agent and to any logic object in the system. L&F agent 114 is a service provider that handles the user interface (e.g., a GUI) for a client (a logic object). It is an important aspect of the present invention that the user interface is completely handled by the L&F agent.

The appearance and behavior of the user interface is entirely controlled by the L&F agent, as described in detail below. L&F agent 114 is a "service provider" for the logic objects. The logic objects interface with L&F agent 114 for visual feedback, interactive input from a human being, and any other user-related tasks. The logic objects send requests to L&F agent 114 for visual feedback on GUI events that require a user's attention. L&F agent 114 receives interaction from a human via the user interface, converts the interaction to a functional request, and sends the functional request to an appropriate logic object. Thus, the logic object does not "know" what GUI is being used.

In the described embodiment, L&F agent 114 acts as a single server running on the user's workstation. Similarly, at least one logic object, such as delivery system logic object 102, functions as a window manager in an X Window system. As discussed above, a preferred embodiment of the present invention uses an object-oriented methodology. Specifically, the implementation may use DOE/DOMF (Distributed Objects Everywhere/Distributed Objects Messaging Format) to communicate between objects.

L&F agent 114 creates and accesses a plurality of composite widgets 306. A "widget" is an object representing a display element, such as a requester box. In the described embodiment, the composite widgets of L&F agent 114 interface with Motif, revision 2.2 in accordance with configuration information 320. It should be understood by persons of ordinary skill in the art that other user interfaces can be used in place of Motif. For example, the present invention can be used with OpenStep, with NextStep, with Windows-95, or with a text-based interface.

Logic object 102 interfaces with L&F agent 114 for the following purposes:

1. Physical communication between the agent and the logic object.
2. Instance name binding. Each display element is considered an "instance" of a type of display object. Logic object 102 starts the display of a display element by binding a new instance name for the display element to display symbols stored in as associated configuration information 320. Configuration information 320 is discussed in more detail in connection with FIG. 9.
3. Upstream message handling. Besides the instance/ name binding, the logic objects sends messages needed to build the look of and feel of the objects, such as a list of the choices in a particular data format.
4. Downstream message handling. In certain implementations a logic object may request a callback (at the time that it initiates an object), where the callback is to be performed, e.g., when the user clicks on a choice in a list of choices. If logic object 102 requires a "callback", L&F agent 114 interfaces its own callbacks registered to the composite widget layer of L&F agent 114.
5. Managing multiple contexts of logic objects. Each L&F agent can communicate with multiple logic objects.
6. Define look and feel policy. Because logic object 102 does not have any look and feel policy, L&F agent 114 defines such a policy from the external configuration information 320 associated with the L&F agent 114. Configuration information 320 is discussed in more detail in connection with FIG. 9.

Figure 4A:
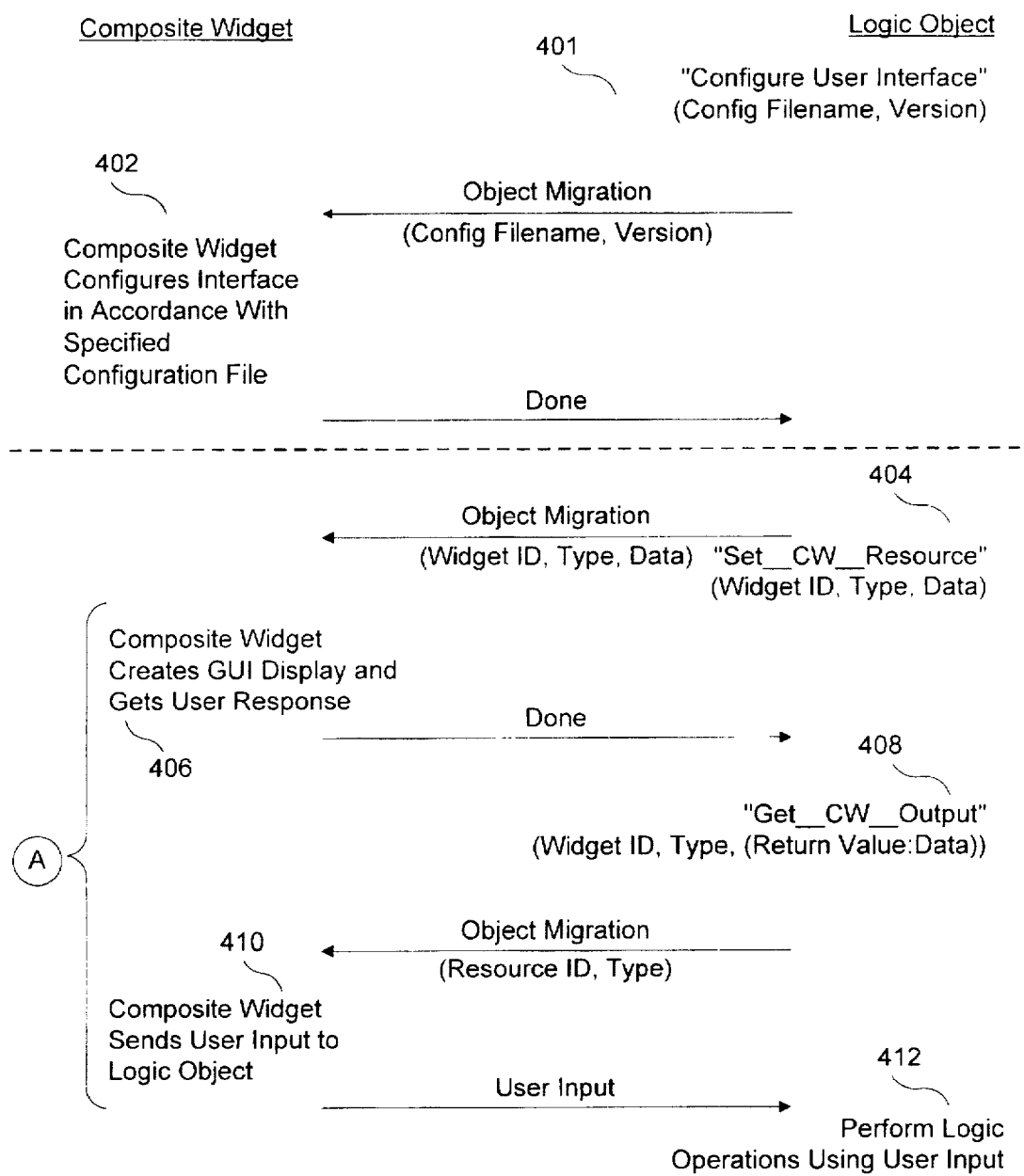
FIGS. 4(a) and 4(b) are diagrams showing steps performed by an exemplary logic object and an exemplary look and feel agent to communicate with a user through a GUI.
Figure 4B:
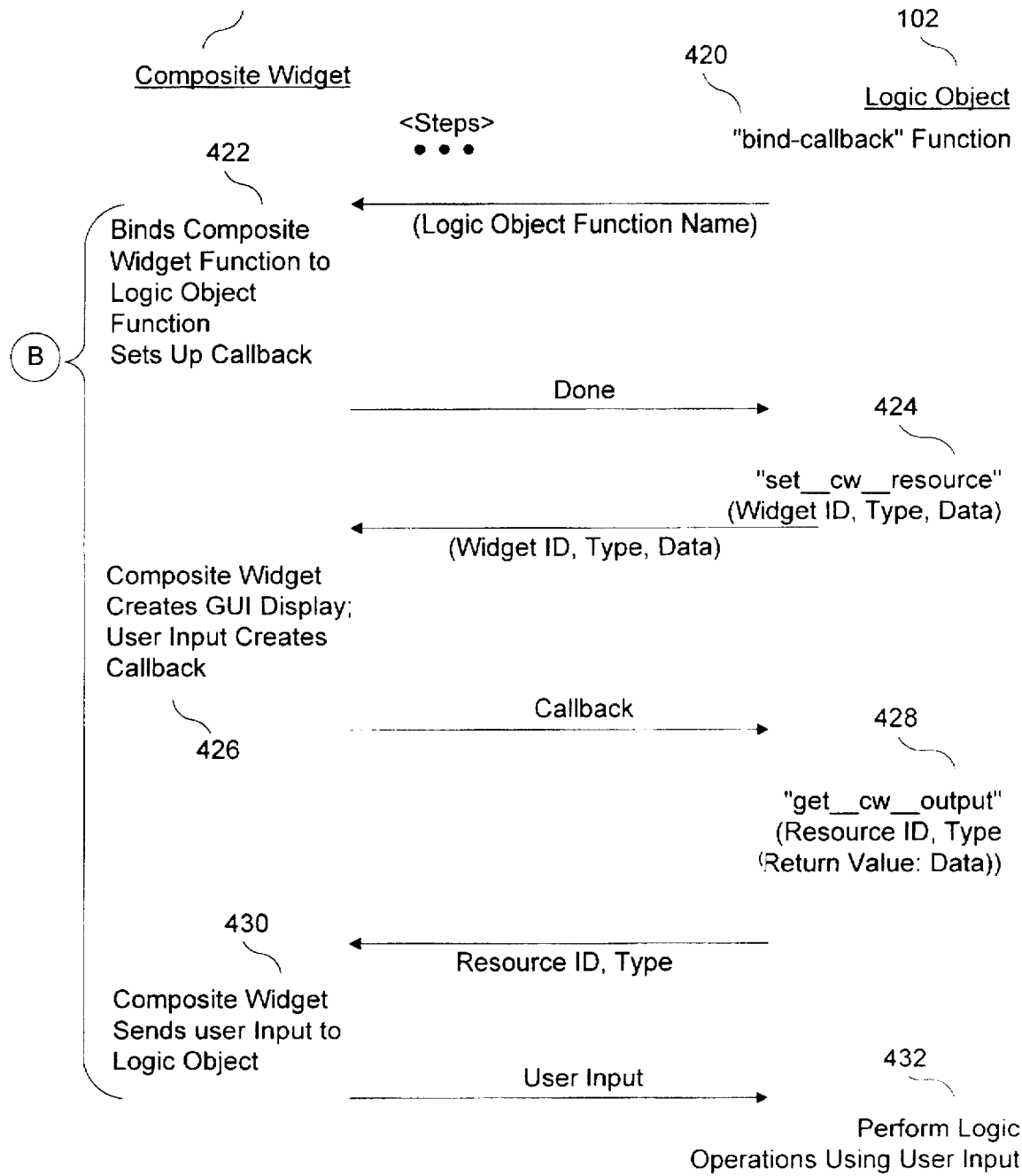

FIGS. 4(a) and 4(b) are diagrams showing steps performed by the logic object 102 and the L&F agent 114. It will be understood by persons of ordinary skill in the art that the steps of FIG. 4 are embodied by a CPU, such as CPU 104 of FIG. 1, that executes instructions stored in a memory of the computer system 100.

In step 401, logic object 102 calls a "configure user interface" routine and passes it a name identifying the configuration information 320. This information is passed to L&F agent 114.

In step 402, LOM 314 reads and parses configuration information 320. Configuration information 320, which is discussed below in more detail, describes a screen layout of the user interface, a list of resources of widgets, and a list of reactions of the logic object to the user's actions. Exemplary user actions include pressing a button, selecting an item in a list, pressing a key, etc. LOM 314 then creates an internal widget list in memory 106 in accordance with the information. In step 404 logic object 102 invokes a function "set_cw_resource" (set composite widget resource). The DOM of the logic object 102 migrates this information to the DOM of L&F agent 114. LOM 314 searches its internal "instantiated" widget list (not shown) for a widget ID specified in the set_cw_resource function. In step 406, LOM 314 invokes the proper member function of the proper composite widget and passes the resource data received from the logic object and the configuration information to the widget.

After the user indicates that his input is complete, the composite widget passes the user input to L&F agent 114. The L&F agent 114 notifies the logic object 102. Logic object 102 invokes a look and feel function "get_cw_output" ("get composite widget output,") in step 408. L&F agent 114 searches its internal "instantiated widget list" in step 410 for a widget ID specified in the get_cw_output function. LOM 314 then gets the requested information from the composite widget and, in step 410, returns the information or data to the calling logic object 102.

FIG. 4(b) shows an alternate embodiment of the present invention employing "call-backs" between the L&F agent and the logic object. In this embodiment, steps 420-432 are performed instead of steps 406-412 of FIG. 4(a). In step 420, logic object 102 calls a "bind-callback" function. The DOM of logic object 102 communicates the name of the logic objects callback function to the agent 114, which "binds" the logic object's call back function name to the name of an existing callback function in the agent.

Thereafter, whenever the user performs an action that has been defined in the L&F agent to invoke the agent's callback function the DOM of the agent will also notify logic object 102 that a callback has occurred (see step 426). The logic object can then request the user input from the L&F agent 114, as discussed above in connection with FIG. 4(a).

FIG. 5 lists the calls that logic object 102 can issue to communicate with L&F agent 114. These calls include: bind_cb, set cw_resource, set_cw_input, and display-GUI.

FIG. 6 shows source code for an example logic object. The logic object calls "config_ui" at line 602; calls "bind_callback" at line 604, and calls set_cw_resource at lines 606.

Figure 7:
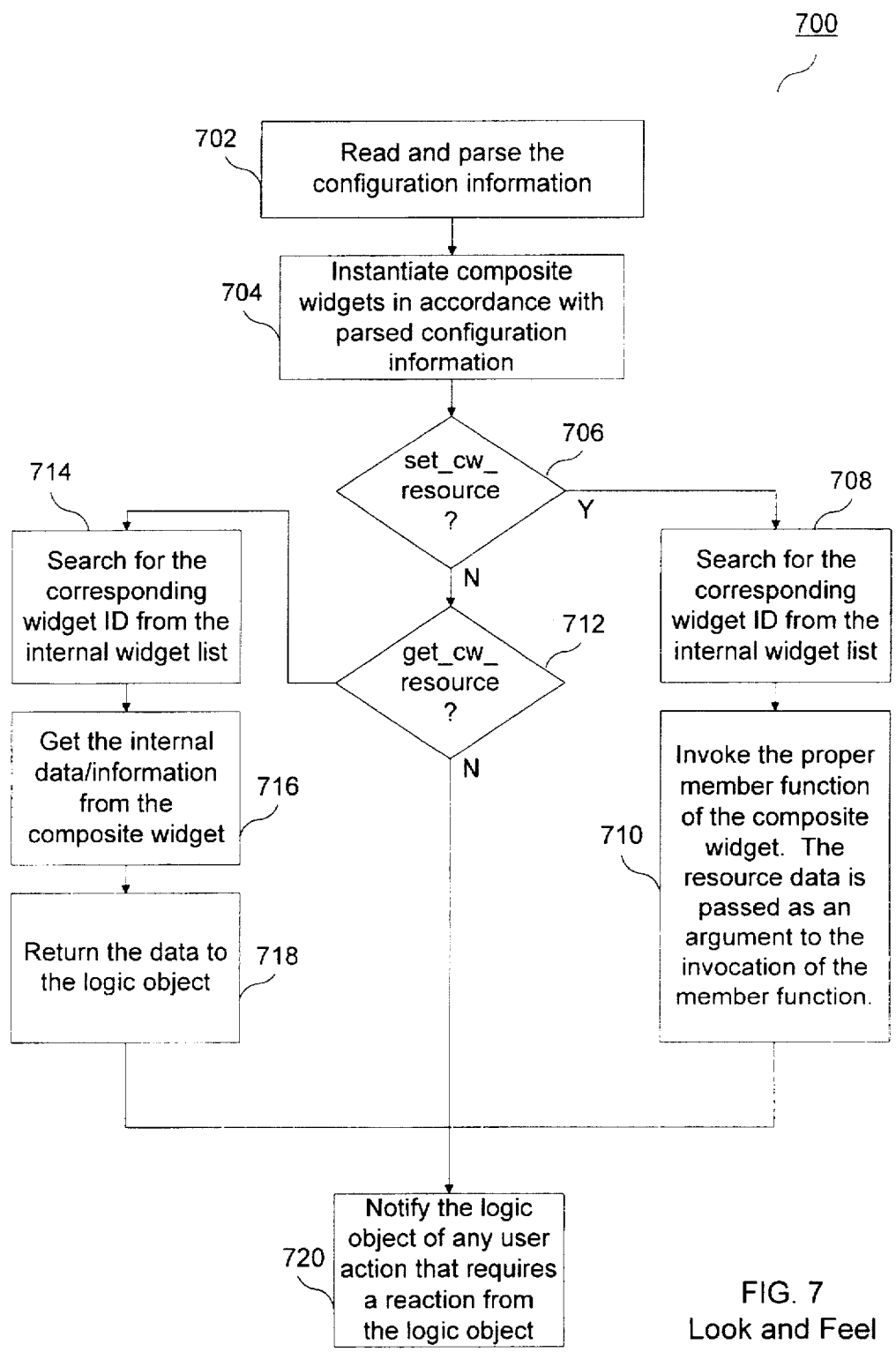
FIG. 7 is a flow chart of exemplary steps performed by a look and feel agent.

FIG. 7 is a flow chart of exemplary steps performed by an L&F agent. Initially, the L&F agent reads and parses configuration information 320 in step 702. In step 704, in accordance with the configuration information, the L&F agent instantiates composite widgets required to implement the GUI to be used.

If, in step 706, the L&F agent receives a set_cw_resource request, the L&F agent searches its "instantiated widget list" in step 708 for a widget that performs the function in the request. In step 710, the L&F agent invokes the proper member function of the composite widget. The resource data in the request is passed as an argument to the invocation of the member function.

If, in step 712, the L&F agent receives a get_cw_output request, the L&F agent searches its "instantiated widget list" in step 714 for a widget that performs the function in the request. In step 716, the L&F agent invokes the proper member function of the composite widget and receives data from the composite widget. In step 718, the L&G agent returns the received data to the logic object. In step 720, the L&F agent notifies the logic object of any user action that requires a reaction from the logic object.

Figure 10:
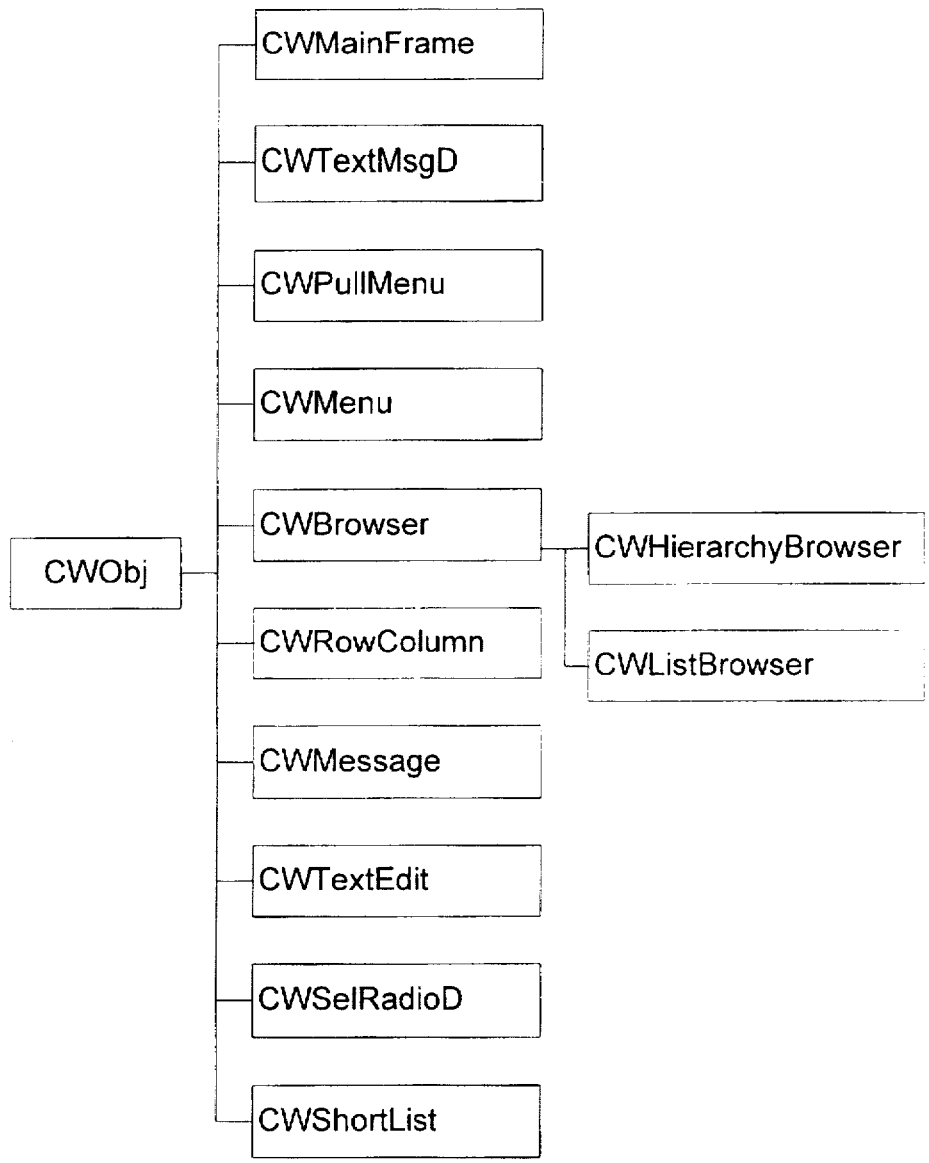
FIG. 10 shows an example of classes of widgets created by the look and feel agent of FIG. 3.

FIG. 8 shows a syntax of configuration information 320. As shown in FIG. 8 at 702, the configuration information preferably has three sections: a LAYOUT section, a RESOURCE section, and an ACTION section. Each section starts with a keyword (LAYOUT, RESOURCE or ACTION) followed by a colon. The LAYOUT section defines the type of the widgets used. The LAYOUT section includes one or more layout statements, each of which includes a widget ID, a class of the widget ID, either another widget ID or a widget tree. FIG. 10 shows exemplary widget classes. An example widget tree might look like:

--- action1(\
 action2 (act2_1, act2_2),\
 action3, \
 action4 (\
  act4-1, act4_2, act4_3 (\
   act4_3_1)\
  )\
).

---

The widget name is more frequently used as configuration information than is the widget tree. The widget tree above is used by LOM 314 to construct a pull-down menu. For example, the delivery subsystem of FIG. 12(b) has a menu button "File" with two subcategories, "deliver" and "quit". Note that "ROOT" is a reserved word in the configuration information 320 representing the root in the widget tree in the configuration information. Whether the widget class "actionMenuW" is rendered as a pull-down menu button or not is decided by the widget itself.

The RESOURCE section of configuration information 320 has one or more resource statements of the form:

widget_id.resource: value

For example, for "load.label: Load Glossary" the action-Menu "load" has a label "Load Glossary".

The ACTION section of configuration information 320 defines actions to be taken upon actions by the human user. Some widgets may produce events which should be handled by the logic or any trigger value changes of other widgets. Logic may also expect results from widgets as it handles the event. These functionalities can be expressed in the following rules action_widget_id: callback ID(output_widget_id_1, output_widget_id_2, ... )

or action_widget_id: <affected_widget_id.resource: value>

The first rule tells L&F agent 114 that when an event comes from "action_widget_id", the event handler, "callbackID", from the logic should be invoked with outputs from "output_widget_id" as arguments. Note that output_widget_ids are optional. The logic also needs to register the actual call-back function to L&F agent 114.

With the second format the source of the affected widget is set to the specified value. It is legal to specify more than one event handler as well as affected widgets. The invoking sequence depends on the appearance in the configuration information.

FIG. 9 shows an example of configuration information in accordance with the syntax of FIG. 8. The configuration information includes a LAYOUT section 902, a resource Section 904, and an action section 906.

As discussed above, the LOM of L&F agent 114 instantiates composite widgets in accordance with configuration information 320.

FIG. 10 shows classes of composite widgets used that can be created by LOM 314 to be used with the Motif user interface. The classes of FIG. 10 are defined as follows:

CWObj:
  The CWObj class is the top of the Composite Widget Set tree.
  The CWObj class is the only class with no superclass. The
  CWObj class is defined as pure virtual class, it is only to be inherited by the every classes in Composite Widget.

CWMainFrame:
> The CWMainFrame class provides the frame with menu bar and message area. The CWMainFrame must be created as base window for all logic objects.

CWTextMsgDF:
> This class contains message area, textfield and confirm buttons. It corresponds to PromptDialog Widget.

CWPullMenu:
> The CRPullMenu class provides a PullDown menu, label and textfield area.

CWMenu:
> The CWMenu class is to add extra menu to the menubar part of the CWMainFrame class. The CWMenu class consists of Pulldown menu, cascade buttons, and a label.

CWBrowser:
> It contains two Selection Box Widgets with two buttons attached to each of the Boxes. It also contains three Label Widgets. The Label widgets are used for the title of the two selection widgets, the label for the left selection widget, and the third is for the right selection widget.

CWHierarchyBrowser:
> Subclass of CWBrowser. In addition to CWBrowser class, CWHierarchyBrowser class provides the hierarchical data handling scheme listed in the Selection Box. It takes a tree structure containing multiple objects as a initialization input, and returns a list of objects being selected.

CWListBrowser:
> Subclass of CWBrowser. In addition to CWBrowser class, CWListBrowser class provides the list data handling scheme displayed in the Selection Box. It takes a list structure containing multiple objects as an initialization input, and returns an objects being selected.

CWMessage:
> MessageDialog class. This class contains message area and confirm buttons.

CWTextEdit:
> Multi line editable text class.

CWSelRadioD:
> This class consists of dialog widget that contains message area, radio buttons for selections, and confirm buttons. It will have BulletinBoard for the body parts.

Figure 11:
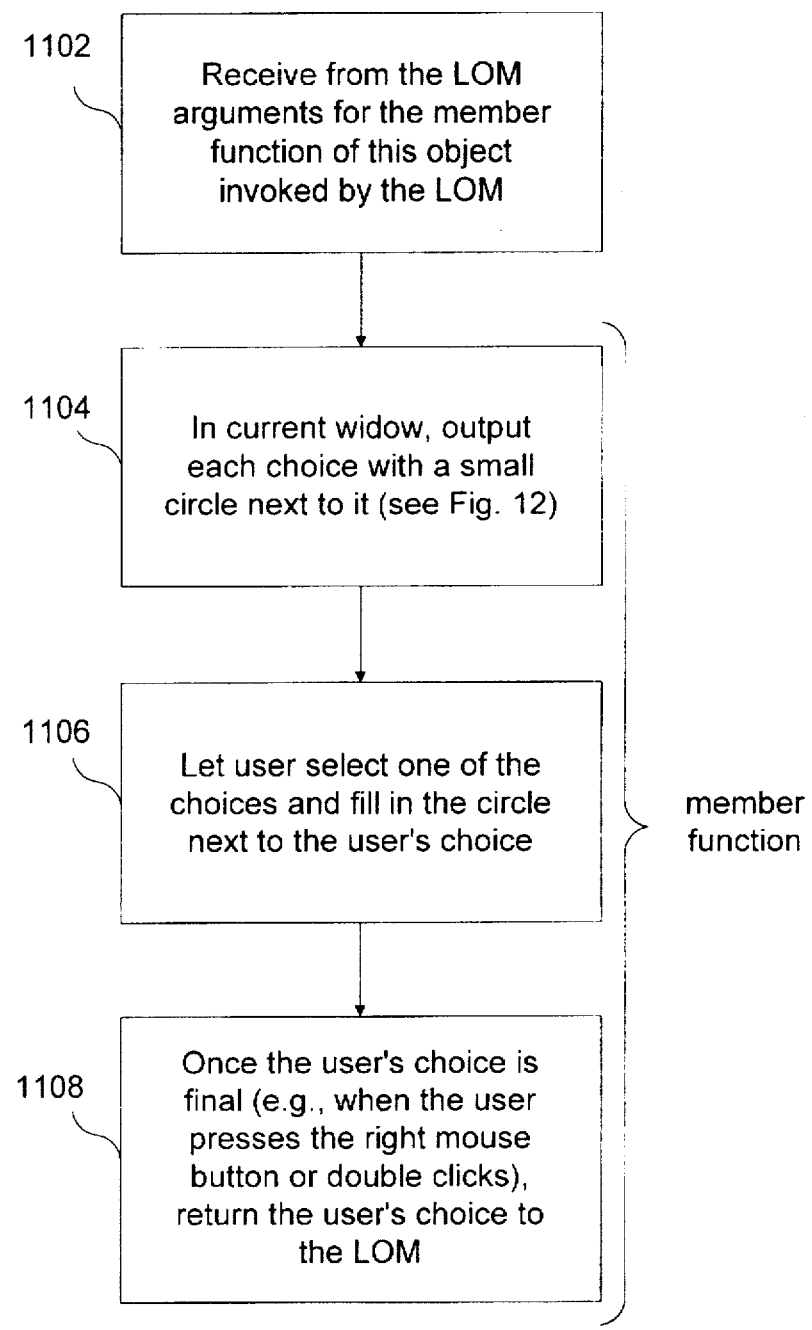
FIG. 11 is a flow chart of steps performed by a first exemplary composite widget.
Figure 13:
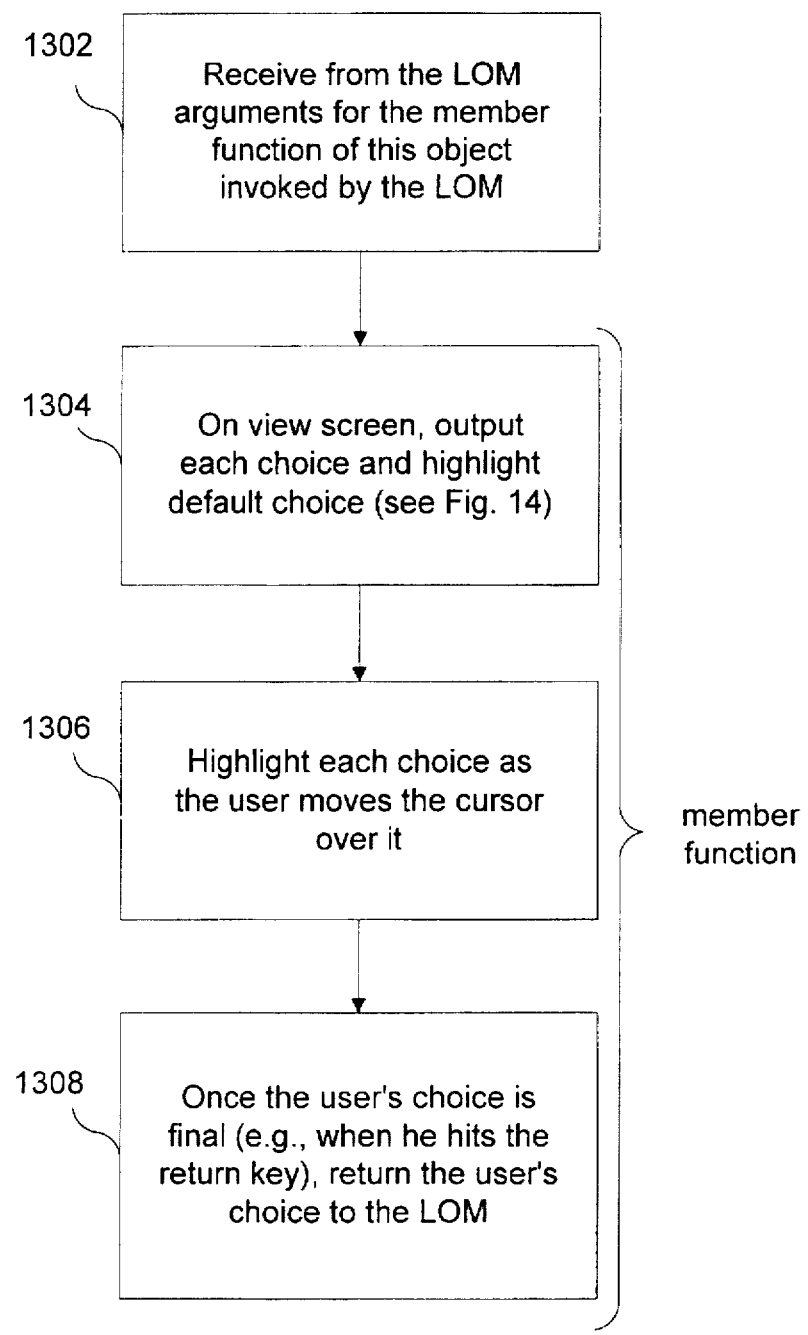
FIG. 13 is a flow chart of steps performed by a second exemplary composite widget.

FIG. 11 is a flow chart of steps performed by a first exemplary composite widget. FIG. 13 is a flow chart of steps performed by a second exemplary composite widget. From the viewpoint of logic object 102, the composite widgets of FIGS. 11 and 13 perform exactly the same function: to display a list of choices and to allow the user to select one of the choices. In fact, however, the first composite widget implements a graphical user interface, while the second composite widget implements a text user interface. The difference between the two composite widgets is totally transparent to logic object 102. The LOM of L&F agent 114 initially instantiates one or the other of the objects of FIGS. 11 and 13, in accordance with configuration information 320.

Figure 12:
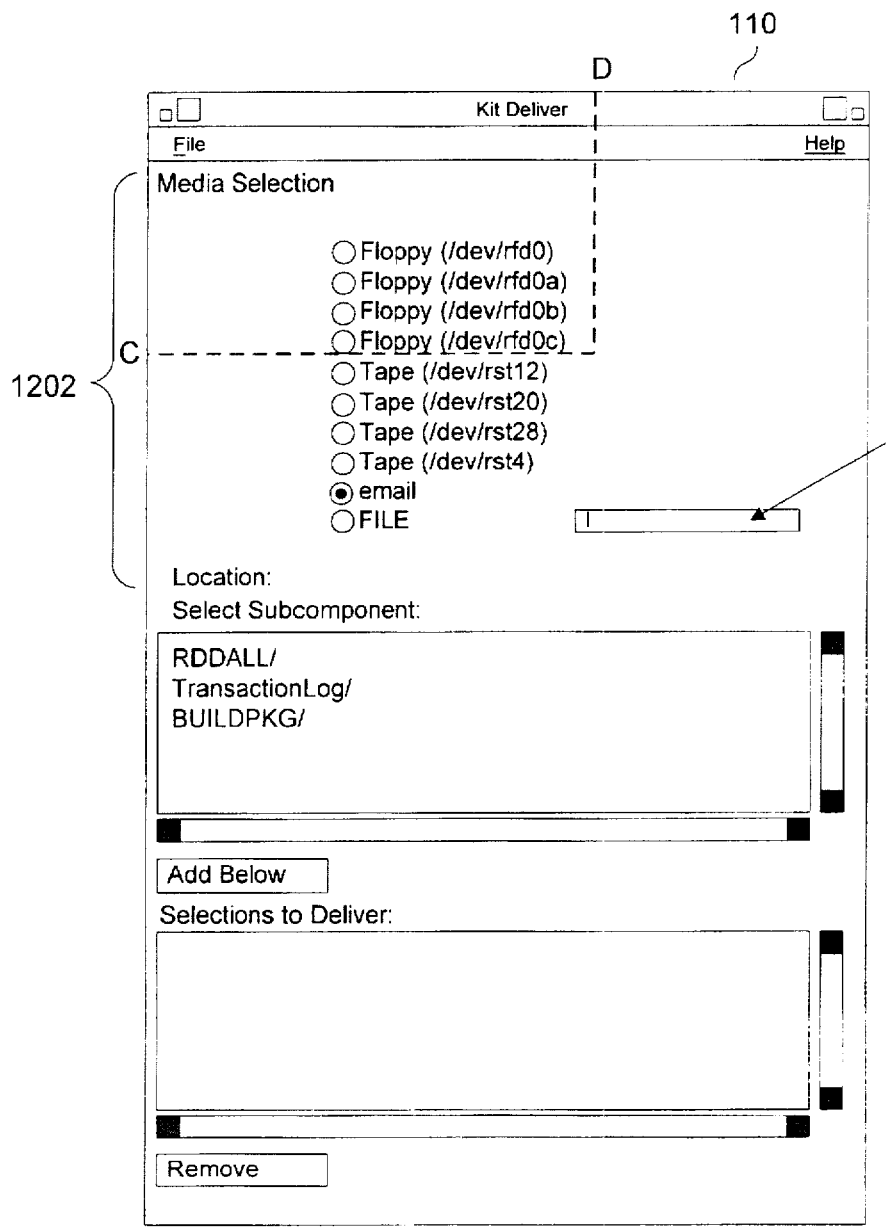
FIG. 12(a) shows an example of a window displayed in accordance with the example configuration information of FIG. 9 and the steps of FIG. 11.
FIG. 12(b) shows an example of a pull-down menu in the window of FIG. 10.
Figure 12B:
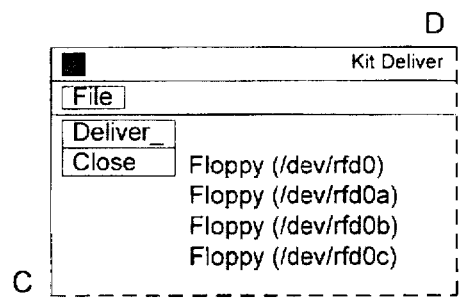

Display area 1202 of FIG. 12 is generated by the steps of FIG. 11, which implements a graphical user interface. In step 1102, the composite widget receives from the LOM arguments for the member function invoked by the LOM. In step 1104, the member function outputs each choice with a small circle next to it. In step 1106, the member function allows the user to select one of the choices with, e.g., a mouse, and fills in the circle next to the selected choice. In step 1108, once the user has made a final selection, as indicated by, e.g., double clicking the mouse button, the member function returns the user's choice to the LOM.

Figure 14:
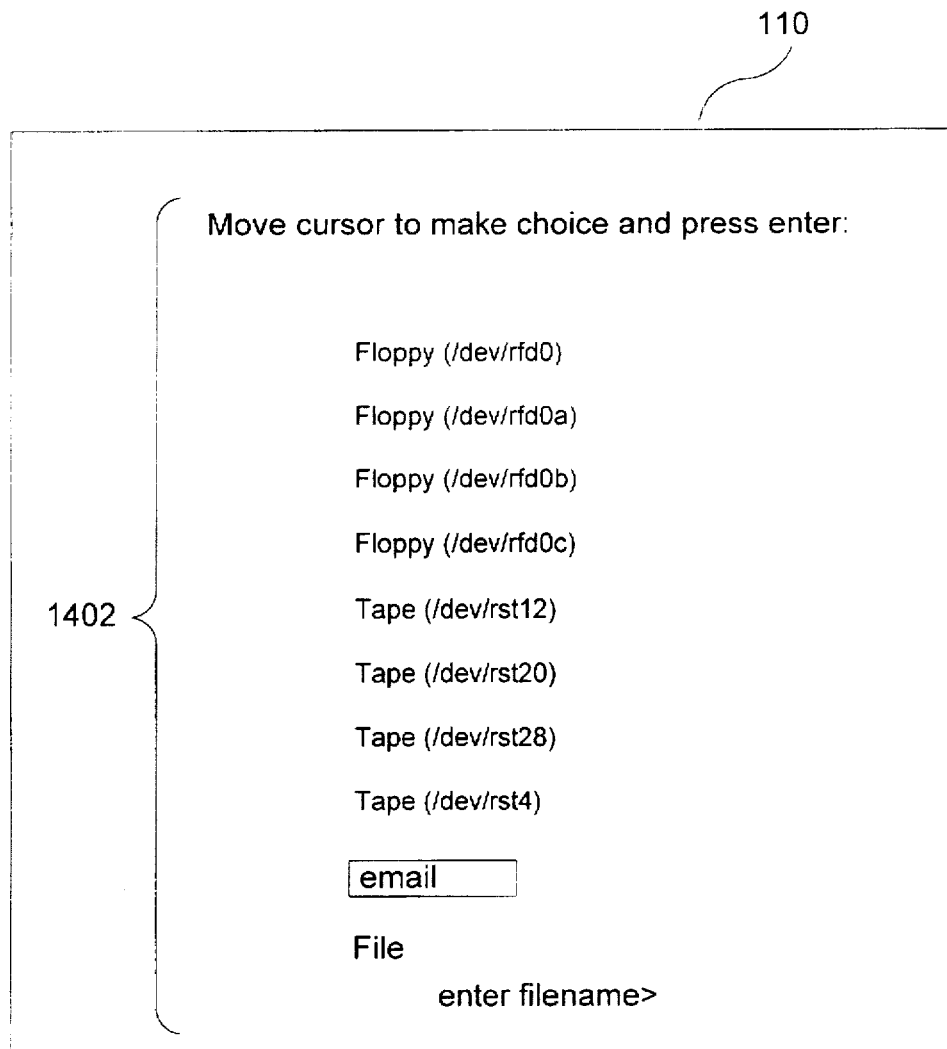
FIG. 14 shows an example of a screen display generated in accordance with the steps of FIG. 13.

Display area 1402 of FIG. 14 is generated by the steps of FIG. 13, which implements a text user interface. In step 1302, the second composite widget receives from the LOM arguments for the member function invoked by the LOM. In step 1304, the member function outputs each choice to the display screen. Note that the second composite widget does not interface with a windowing system, as does the composite widget of FIGS. 11 and 12. In step 1306, the member function allows the user to select the choices by moving a cursor virtually using, e.g., keys on a keyboard. Each choice is highlighted as the cursor passes over it. In step 1308, once the user has made a final selection, as indicated by, e.g., hitting the "return" key on the keyboard, the member function returns the user's choice to the LOM.

FIGS. 15(a) through 15(c) show an example composite widget. The composite widget shown is the widget to generate the main window in a windowing subsystem. Thus, the widget generates a menubar, a window body, and a footer area.

As will be understood by persons of ordinary skill in the art, a system in accordance with the present invention may contain any number of widgets in an L&F agent, and those widgets may perform any functionality required to generate a desired user interface. As discussed above, the widgets may implement any type of desired user interface, such as a graphical user interface or a text user interface. The type of user interface implemented is transparent to any logic objects interfacing with the L&F agent.

Several preferred embodiments of the present invention have been described. Nevertheless, it will be understood that various modifications may be made without departing from the spirit and scope of the invention.

In describing the preferred embodiment, a number of specific technologies used to implement the embodiments of various aspects of the invention were identified and related to more general terms in which the invention was described. However, it should be understood that such specificity is not intended to limit the scope of the claimed invention.

What is claimed is:

1. A method of controlling the appearance and behavior of data displayed on a display device in a data processing system, said method performed by the data processing system, and comprising the steps of:

> defining, by a look and feel agent, an appearance of a widget using configuration information that is not a part of the look and feel agent, the look and feel agent operable with one of a plurality of operating system GUIs;
>
> performing, by a core logic object, a core logic function;
>
> determining, by the core logic object during performance of the core logic function, that data must be displayed on the display device;
>
> sending information from the core logic object to the look and feel agent, the information representing the data to be displayed but not representing which of the plurality of operating system GUIs is being used to display the data; and
>
> displaying, by the widget of the look and feel agent, in accordance with a corresponding one of the plurality of operating system GUIs, the data represented by the information sent by the core logic object.

2. A method of controlling the appearance and behavior of data displayed on a display device in a data processing system, said method performed by the data processing system, and comprising the steps of:

defining, by a look and feel agent, an appearance of a widget using configuration information that is not a part of the look and feel agent;

performing, by a core logic object, a core logic function, the core logic object operable with all of a plurality of operating system GUIs but not knowing which operating system GUI is being used by the data processing system;

determining, by the core logic object during performance of the core logic function, that data must be displayed on the display device;

sending information from the core logic object to the look and feel agent, the information representing the data to be displayed but not representing which of the plurality of operating system GUIs is being used to display the data; and displaying, by the widget of the look and feel agent, in accordance with a corresponding one of the plurality of operating system GUIs, the data represented by the information sent by the core logic object.

3. The method of claim 2, further including the step of returning control by the look and feel agent to the core logic object when the look and feel agent receives a callback from the widget.

4. The method of claim 2, wherein the configuration information has a layout section, a resource section, and an action section.

5. The method of claim 2, wherein the sending step includes the step of migrating objects between the core logic object and the look and feel agent.

6. The method of claim 2, further including the steps of:

defining, by a second look and feel agent, a second widget using second configuration information that is not a part of the second look and feel agent and that is different from the first configuration information.

7. The method of claim 2, wherein the configuration information corresponds to a first user interface.

8. The method of claim 6, wherein the second configuration information corresponds to a second user interface.

9. A computer program product including:

a computer usable medium having computer readable code embodied therein for controlling the appearance and behavior of data displayed in a data processing system, the computer program product comprising:

computer readable program code devices configured to cause a computer to effect defining, by a look and feel agent, an appearance of a widget using configuration information that is not a part of the look and feel agent;

computer readable program code devices configured to cause a computer to effect performing, by a core logic object, a core logic function, the core logic object operable with all of a plurality of operating system GUIs, but not knowing which operating system GUI is being used by the data processing system;

computer readable program code devices configured to cause a computer to effect determining, by the core logic object during performance of the core logic function, that data must be displayed on the display device;

computer readable program code devices configured to cause a computer to effect sending information from the core logic object to the look and feel agent, the information representing the data to be displayed, but not representing which of the plurality of operating system GUIs is being used to display the information; and computer readable program code devices configured to cause a computer to effect displaying, by the widget of the look and feel agent, in accordance with a corresponding one of the plurality of operating system GUIs, the data represented by the information sent by the core logic object.

10. The computer program product of claim 9, further including computer readable program code devices configured to effect returning control by the look and feel agent to the core logic object when the look and feel agent receives a callback from the widget.

11. The computer program product of claim 9, wherein the configuration information has a layout section, a resource section, and an action section.

12. The computer program product of claim 9, wherein the computer readable program code devices configured to cause a computer to effect sending include computer readable program code devices configured to cause a computer to effect migrating objects between the core logic object and the look and feel agent.

13. The computer program product of claim 9, further including:

computer readable program code devices configured to cause a computer to effect defining, by a second look and feel agent, a second widget using second configuration information that is not a part of the second look and feel agent and that is different from the first configuration information.

14. The computer program product of claim 13, wherein the configuration information corresponds to a first user interface.

15. The computer program product of claim 14, wherein the second configuration information corresponds to a second user interface.

16. An apparatus for controlling the appearance and behavior of data displayed on a display device in a data processing system having a memory, comprising:

a look and feel agent, stored in the memory, that defines an appearance of a widget in accordance with configuration information that is not a part of the look and feel agent; and a core logic object, stored in the memory, that performs a core logic function, the core logic object determining during performance of the core logic function, that data must be displayed on the display device and sending information representing the data to be displayed to the look and feel agent, wherein the widget of the look and feel agent displays the data represented by the information sent by the core logic object.

17. A computer program product, comprising:

a computer usable medium having computer readable code embodied therein for providing a look and feel agent designed to communicate with a core logic object that performs a core logic function, the computer program product for the look and feel agent comprising:

computer readable program code devices configured to cause a computer to effect defining an appearance of a widget of the look and feel agent in accordance with configuration information that is not a part of the look and feel agent;

computer readable program code devices configured to cause a computer to effect receiving data sent by the core logic object, when the core logic object determines, during performance of the core logic function, that data must be displayed on the display device and sending information representing the data to the look and feel agent; and computer readable program code devices configured to cause a computer to effect displaying, by the widget of the look and feel agent, the data represented by the information sent by the core logic object, in accordance with an operating system graphical user interface (GUI) not known to the core logic object.

* * * * *